US012352239B2

(12) United States Patent
Maini

(10) Patent No.: US 12,352,239 B2
(45) Date of Patent: Jul. 8, 2025

(54) HELICAL TURBINE

(71) Applicant: Maini Renewables Private Limited, Mumbai (IN)

(72) Inventor: Swati Maini, Mumbai (IN)

(*) Notice: Subject to any disclaimer, the term of this patent is extended or adjusted under 35 U.S.C. 154(b) by 0 days.

(21) Appl. No.: 18/682,462

(22) PCT Filed: Aug. 12, 2022

(86) PCT No.: PCT/IB2022/057526
§ 371 (c)(1),
(2) Date: Feb. 9, 2024

(87) PCT Pub. No.: WO2023/017470
PCT Pub. Date: Feb. 16, 2023

(65) Prior Publication Data
US 2024/0344497 A1 Oct. 17, 2024

(30) Foreign Application Priority Data
Aug. 12, 2021 (IN) .............................. 202121036536

(51) Int. Cl.
*F03D 3/06* (2006.01)
*F03B 3/12* (2006.01)

(52) U.S. Cl.
CPC .............. *F03D 3/061* (2013.01); *F03B 3/121* (2013.01); *F03D 3/064* (2013.01); *F05B 2250/25* (2013.01)

(58) Field of Classification Search
CPC .......... F03D 3/064; F03D 3/011; F03D 3/061; F05D 2250/25; F05B 2240/212; F03B 3/12; F03B 3/121
See application file for complete search history.

(56) References Cited

U.S. PATENT DOCUMENTS 10,094,361 B2 * 10/2018 Bardia .................... H02K 7/183
10,746,155 B2 * 8/2020 Moloney ................. F03B 13/10
(Continued)

FOREIGN PATENT DOCUMENTS

EP 1413748 A1 * 4/2004 ............... F03D 3/04
GB 2451670 A * 2/2009 ............. F03D 3/005
(Continued)

OTHER PUBLICATIONS

Patent Cooperation Treaty, "International Search Report", App. No. PCT/IB2022/057526, Oct. 20, 2022, 3 pgs.
(Continued)

*Primary Examiner* — Eldon T Brockman
(74) *Attorney, Agent, or Firm* — Carlson, Caspers, Vandenburgh & Lindquist, P.A.

(57) ABSTRACT

Described herein is a rotor assembly 100 for a turbine. The rotor assembly comprises a plurality of helical rotor blades 102a, 102b, 102c being curved about their respective longitudinal axes. At least one connecting member 104a, 104b, 104c is attached to each of the plurality of helical rotor blades. Each helical rotor blades comprises a plurality of fins 106. The rotor assembly improves the rotational, aerodynamic and overall efficiency of rotating systems, and is configured to sustain lift in an efficient manner. The rotor assembly ensures that during operation, the fluid contacts in the entire 360 degree with the helix, thereby aiding the improvement of efficiency even at low speeds of incoming fluid.

15 Claims, 9 Drawing Sheets

(56) References Cited

U.S. PATENT DOCUMENTS

| | | | |
|---|---|---|---|
| 10,938,274 B2* | 3/2021 | Sauchyn | F03B 13/264 |
| 11,629,691 B2* | 4/2023 | Kittel | F03D 3/005 |
| | | | 416/223 R |
| 2006/0257240 A1* | 11/2006 | Naskali | F03D 3/061 |
| | | | 415/4.4 |
| 2012/0163976 A1* | 6/2012 | Batista | F03D 7/06 |
| | | | 416/120 |
| 2015/0017008 A1* | 1/2015 | Ramachandran | F03D 1/0633 |
| | | | 416/223 B |
| 2018/0291868 A1* | 10/2018 | Moloney | H02K 7/1823 |
| 2020/0158074 A1* | 5/2020 | Inagaki | F03B 3/126 |
| 2020/0251960 A1 | 8/2020 | Sauchyn | |
| 2020/0408191 A1* | 12/2020 | Kittel | F03D 3/061 |

FOREIGN PATENT DOCUMENTS

| | | | | |
|---|---|---|---|---|
| SE | 1430063 A1 | 1/2015 | | |
| WO | 2013109133 A1 | 7/2013 | | |
| WO | WO-2017019004 A1 * | 2/2017 | | F03D 3/062 |

OTHER PUBLICATIONS

Patent Cooperation Treaty, "Written Opinion of the International Searching Authority", App. No. PCT/IB2022/057526, Oct. 20, 2022, 4 pgs.

* cited by examiner

HELICAL TURBINE

CROSS REFERENCE TO RELATED APPLICATIONS

This application is a national phase application, filed under 35 U.S.C. § 371, of International Patent Application No. PCT/IB2022/057526, filed on Aug. 12, 2022, which claims the benefit of Indian Application No. 202121036536, filed Aug. 12, 2021, the contents of which are incorporated by reference herein in their entirety.

TECHNICAL FIELD

The present subject matter in general relates to airfoils for generation of energy or propulsion of power and in particular relates to a rotor assembly for helical turbines comprising rotating airfoils.

BACKGROUND

Airfoils are responsible for generating lift or drag in an object. For instance, when an airplane, propeller or turbine moves through a fluid, the airfoil in the blade or tail of the airplane or in the blade of the propeller or turbine produces the desired lifting force that acts perpendicular or parallel to the stream of fluid. Generally, profile of airfoils for rotating turbines and propellers are derived from NACA (National Advisory Committee for Aeronautics) and are often known as NACA airfoils.

Conventionally, the NACA airfoils are designed to be suitable for straight and level flight, for example, airplanes. However, the conventional airfoils do not address the issues related to rotating objects such as a rotary turbines. With the advancement in renewable energy installations including fluid turbine systems, such as wind and hydro turbine installations, it is imperative to improve performance of such installations by enhancing their helical rotor blades efficiency and at the same time overcoming challenges in operating, installation and maintenance of such systems.

Turbines with helical airfoil sections are considered to have better efficiency than straight airfoil sections because the straight blade turbines experience impact on the blades in short bursts as the fluid interacts with the blade. For instance, the reported efficiency of a Gorlov helical turbine is about 35%. However, this reported efficiency has not been achieved beyond lab scale models.

Therefore, a heretofore unaddressed need for an airfoil and associated turbines exists in the industry to address the aforementioned deficiencies and inadequacies as well as the challenges of compromised efficiency as well as limited power output of hydrokinetic and aerokinetic turbine installations.

SUMMARY

It is an object of the present subject matter to provide airfoils that address challenges involved with rotating objects, such as helical rotor blades and propellers.

It is another object of the present subject matter to provide improved rotating airfoils for power generation/propulsion.

It is yet another object of the present subject matter to improve performance of power generation and propulsion systems.

It is yet another object of the present subject matter to provide an improved and cost-effective airfoil for turbine blades.

It is yet another object of the present subject matter to enhance rotational efficiency of rotating energy generation systems employed, for example, in fluid turbine systems such as wind and hydro turbine installations.

It is yet another object of the present subject matter to enhance aerodynamic efficiency of rotating energy generation systems employed, for example, in fluid turbine systems such as wind and hydro turbine installations.

It is yet another object of the present subject matter to enhance the overall efficiency of rotating systems employed, for example, in fluid turbine systems such as wind and hydro turbine installations.

It is yet another object of the present subject matter to reduce installation and maintenance cost in a rotor-based energy generation system.

It is yet another object of the present subject matter to enhance efficiency of a hydrokinetic turbine, particularly at low speeds.

It is yet another object of the present subject matter to enhance efficiency of turbines, especially helical turbines.

It is yet another object of the present subject matter to enhance power production per unit area of the installed capacity in hydrokinetic and aerokinetic turbines.

It is yet another object of the present subject matter to improve connectedness of fluid with the turbine blades.

It is yet another object of the present subject matter to reduce the drag generated during operation of helical rotor blades.

The present subject matter relates to a rotor assembly for a turbine, the rotor assembly comprising a plurality of helical rotor blades being curved about their respective longitudinal axes; and at least one connecting member attached to each of the plurality of helical rotor blades; each helical rotor blades comprising a plurality of fins.

In an embodiment, the helical rotor blades are curved in a helical shape defining a predetermined helix/twist angle.

In another embodiment, the helical rotor blades are curved to position an upper half portion of each helical rotor blades on a first side of the respective longitudinal axis and a lower half portion of each helical rotor blades on a second side, opposite to the first side of the respective longitudinal axis.

In yet another embodiment, the upper half portion comprises a portion of helical rotor blades above a respective transverse axis of the helical rotor blades and the lower half portion of the helical rotor blades comprises a portion below the respective transverse axis of the helical rotor blades.

In yet another embodiment, the connecting member is a Y-shaped member comprising three profile arms.

In yet another embodiment, each profile arm of the connecting member is attached to a different helical rotor blades.

In yet another embodiment, a plurality of connecting members is provided above one another with a predefined distance between two consecutive connecting members.

In yet another embodiment, the plurality of connecting members is coaxial with a central longitudinal axis of the rotor assembly.

In yet another embodiment, the helical rotor blades and the connecting members are configured to rotate about the central longitudinal axis of the rotor assembly.

In yet another embodiment, the plurality of fins is disposed on a surface of each of the helical rotor blades.

In yet another embodiment, the fins comprise a NACA profile same as the NACA profile of the helical rotor blades.

In yet another embodiment, the fins comprise an enlarged NACA profile in comparison to the NACA profile of the helical rotor blades.

In yet another embodiment, the profile of the fins is enlarged in scale by 1.1-2 times, preferably, 1.2 times of the profile of the helical rotor blades.

In yet another embodiment, about 20% of each fin with enlarged profile is shaved off from towards the trailing edge of each fin.

In yet another embodiment, the fins are attached to the surface of the helical rotor blades by merging the profile of fins with the profile of the helical rotor blades.

In yet another embodiment, each helical rotor blades comprises four fins positioned equidistant from each other through a predetermined distance, said predetermined distance between the fins is equal for each of the plurality of helical rotor blades.

In yet another embodiment, a fillet is obtained from enlarged profile of fins and added at a junction of the trailing edge of each fin and the surface of the helical rotor blades.

In yet another embodiment, a distance of each fin from a top end or a bottom end of the helical rotor blades is equal for each of the plurality of helical rotor blades.

In yet another embodiment, a lane/channel is formed between each pair of the fins and a fluid flowing around the helical rotor blades sticks through said channels.

In yet another embodiment, the fluid flowing around the helical rotor blades is water.

Numerous additional features, embodiments, and benefits of the methods and apparatus of the present invention are discussed below in the detailed description which follows.

BRIEF DESCRIPTION OF ACCOMPANYING DRAWINGS

The present invention, both as to its organization and manner of operation, together with further objects and advantages, may best be understood by reference to the following description, taken in connection with the accompanying drawings. These and other details of the present invention will be described in connection with the accompanying drawings, which are furnished only by way of illustration and not in limitation of the invention, and in which drawings.

DETAILED DESCRIPTION

Figure 1:
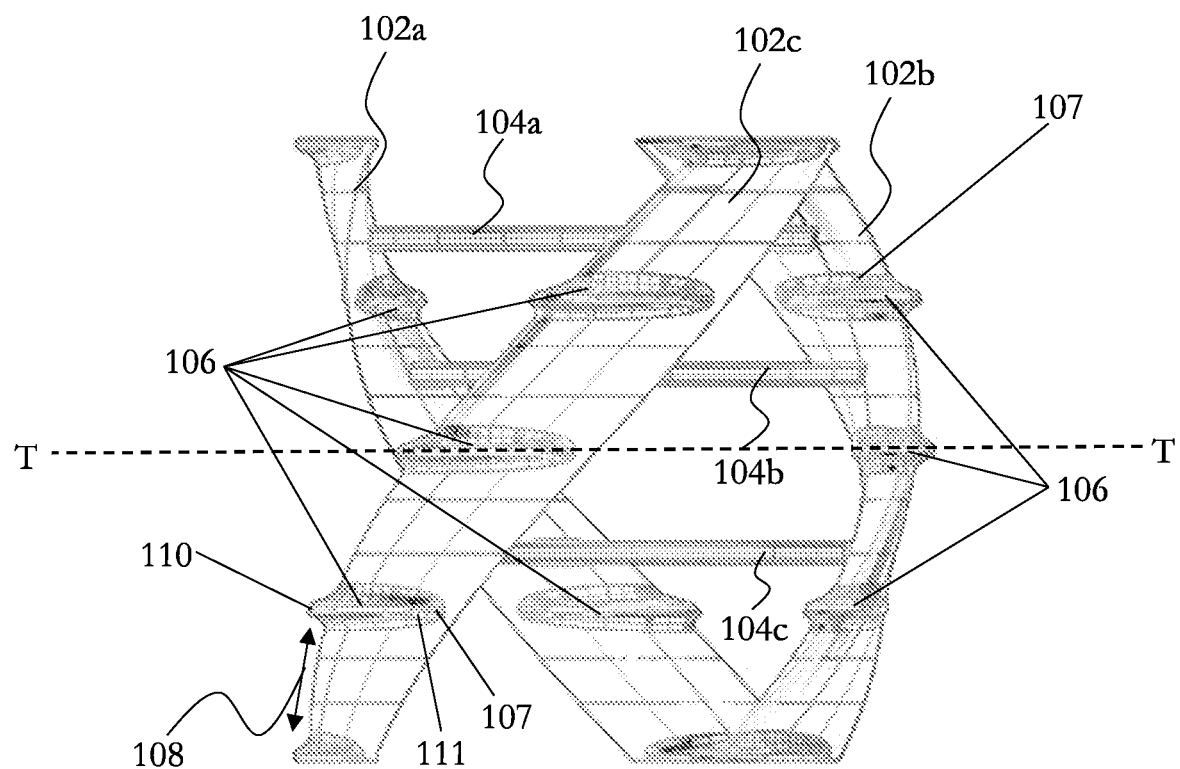
FIG. 1 illustrates a front view of a rotor assembly of a turbine for power production in accordance with an embodiment of the present subject matter.

The following presents a detailed description of various embodiments of the present subject matter with reference to the accompanying drawings.

The embodiments of the present subject matter are described in detail with reference to the accompanying drawings. However, the present subject matter is not limited to these embodiments which are only provided to explain more clearly the present subject matter to a person skilled in the art of the present disclosure. In the accompanying drawings, like reference numerals are used to indicate like components.

The specification may refer to "an", "one", "different" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "attached" or "connected" or "coupled" or "mounted" to another element, it can be directly attached or connected or coupled to the other element or intervening elements may be present. As used herein, the term "and/or" includes any and all combinations and arrangements of one or more of the associated listed items.

The figures depict a simplified structure only showing some elements and functional entities, all being logical units whose implementation may differ from what is shown.

Rotors determine efficiency and performance of a rotating system. Efficiency of a hydrokinetic turbine is important and more so at low speeds. The present invention provides a solution to improve the rotational efficiency, aerodynamic efficiency and overall efficiency of rotating systems. The rotating airfoils according to the present subject matter is configured to sustain lift in an efficient manner. The present invention also provides a method for generating a lift in applications including but not restricted to vertical and/or horizontal axis wind and/or other fluid turbines, such as hydro turbines, and propellers. In helical turbines, the fluid contacts in the entire 360 degree with the helix, thereby aiding the improvement of efficiency even at low speeds of incoming fluid.

The present subject matter relates to an airfoil that can be employed for power generation and/or propulsion. The airfoil according to the present invention is most suitable for rotating systems comprising but not limited to turbines and/or propeller blades. In a preferred embodiment, the airfoil of the present subject matter comprises a rotating airfoil for use in hydrokinetic and aerokinetic turbines. The rotating airfoil is configured to be employed in generating mechanical power that can be converted and stored into other forms of energy sources like compressed air, electricity and the like. Alternatively, the airfoils according to the present subject matter can be used in driving and/or driven propeller blades of propulsion applications.

In an embodiment, the present invention provides a rotor assembly for a turbine. The rotor assembly according to a preferred embodiment comprises a plurality of helical rotor blades being curved about their respective longitudinal axes and at least one connecting member attached to the helical rotor blades. The helical rotor blades are curved in a helical shape defining a predetermined helix/twist angle. In an embodiment, the predetermined helix/twist angle, i.e., starting angle to ending angle, is about 120 degrees. The helical rotor blades are curved to position an upper half portion of each helical rotor blades on a first side of the respective longitudinal axis and a lower half portion of each helical rotor blades on a second opposite side to the first side of the respective longitudinal axis. The upper half portion is a portion of helical rotor blades above a respective transverse axis of the helical rotor blades and the lower half portion of the helical rotor blades is a portion below the respective transverse axis of the helical rotor blades.

According to an embodiment, the connecting member is a Y-shaped member comprising three profile arms. Each profile arm of the connecting member is attached to a different helical rotor blades. In an embodiment, a plurality of connecting members is arranged over each other with a predefined distance between two connecting members. The plurality of connecting members is coaxial with a central longitudinal axis of the rotor assembly. Moreover, the helical rotor blades and the connecting members are configured to rotate about the central longitudinal axis of the rotor assembly.

Furthermore, a plurality of fins is disposed on a surface of each of the helical rotor blades. The fins comprise a NACA profile that is same as the NACA profile of the respective helical rotor blades. In a preferred embodiment, the fins comprise an enlarged NACA profile in comparison to the NACA profile of the helical rotor blades. The profile of the fins is enlarged in scale by 1.1-2 times, preferably, 1.2 times of the profile of the helical rotor blades in an embodiment. The fins are attached to the surface of the helical rotor blades by merging the profile of fins with the profile of the helical rotor blades. According to an embodiment, about 20% of each fin with enlarged profile is shaved off from towards the trailing edge of each fin. Furthermore, a fillet is obtained from enlarged profile of fins and added at a junction of the trailing edge of each fin and the surface of the helical rotor blades in an embodiment.

According to a preferred embodiment, each helical rotor blades comprises four fins positioned equidistant from each other through a predetermined distance. In an embodiment, the predetermined distance between consecutive fins is equal for each of the plurality of helical rotor blades. In an embodiment, five fins are employed in the helical rotor blades. In a preferred embodiment, the fins divide the helix into four equal sections from bottom to top. Moreover, in an embodiment, a distance of each fin from a top end or a bottom end of the helical rotor blades is equal for each of the plurality of helical rotor blades. A lane/channel is formed between each pair of the fins such that the fluid, such as water, flowing around the helical rotor blades sticks through said channels.

Figure 2:
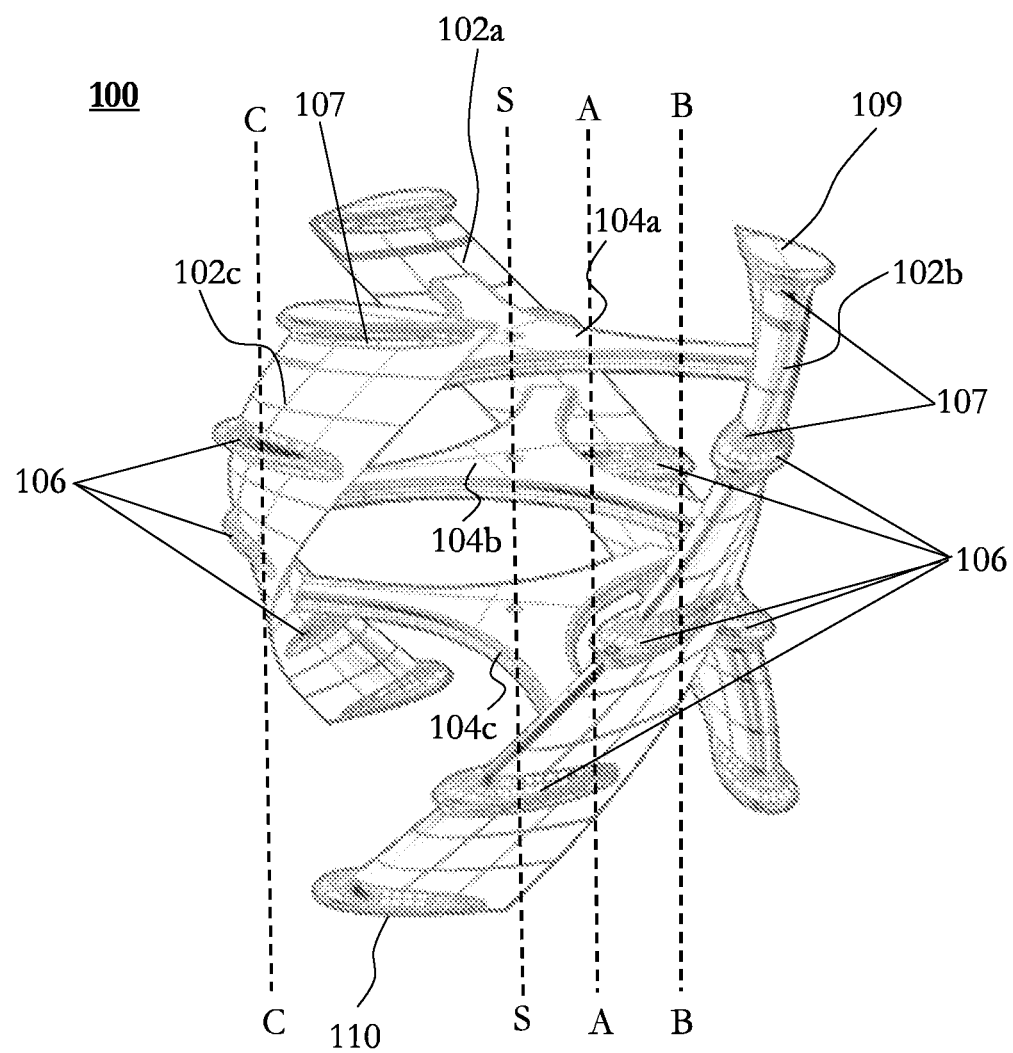
FIG. 2 illustrates a perspective view of a rotor assembly of the turbine for power production in accordance with the embodiment of FIG. 1.
Figure 3:
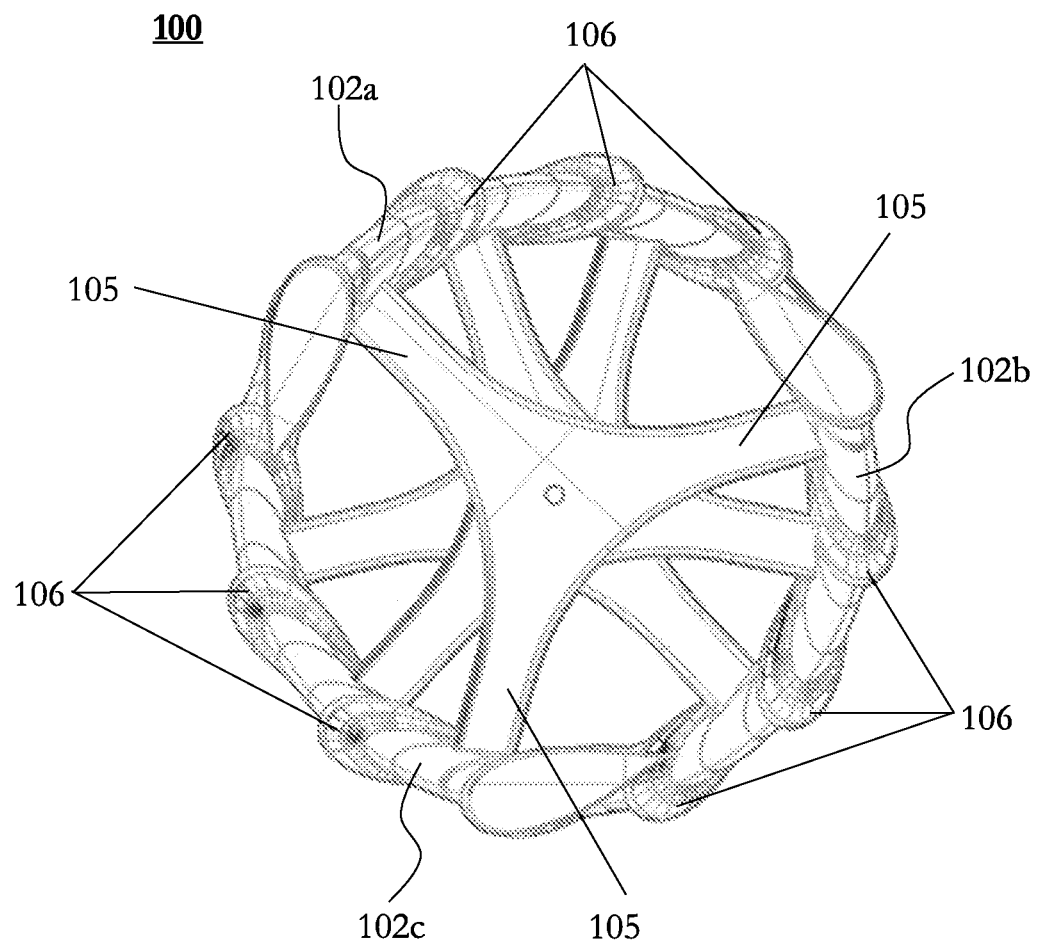
FIG. 3 illustrates a top view of a rotor assembly of the turbine for power production in accordance with the embodiment of FIG. 1.

FIGS. 1 to 3 illustrate a front view, a perspective view and a top view respectively of a rotor assembly 100 of a turbine, preferably, hydrokinetic or aerokinetic turbines, for power production. In accordance with the present subject matter, the rotor assembly 100 can be employed in applications including but not limited to turbines of wind and/or hydro turbine installations as well as propellers that are used in air and water travel. In an embodiment, the rotor assembly comprises the driving or driven propeller blades having rotating air foils for energy generation or propulsion. In a preferred embodiment, the rotor assembly 100 is configured to be employed in a helical turbine.

As shown in FIGS. 1 to 3, the rotor assembly 100 according to the present subject matter comprises a plurality of helical rotor blades 102a, 102b, 102c which are curved about their respective axes A-A, B-B and C-C. In an embodiment, the helical rotor blades 102a, 102b, 102c are placed in parallel configuration and equidistant from one another. In other words, the helical rotor blades 102a, 102b, 102c are axially parallel with respect to each other and are arranged at an equal interval from each other. Furthermore, the helical rotor blades 102a, 102b, 102c are curved to position an upper half portion of each helical rotor blades towards one side of the respective longitudinal axis and the lower half portion of each helical rotor blades towards other side of the respective longitudinal axis. The upper half portion is a portion of helical rotor blades above a respective transverse axis of the helical rotor blades and the lower half portion of the helical rotor blades is a portion below the respective transverse axis of the helical rotor blades. In a preferred embodiment, the transverse axis T-T is common for the plurality of helical rotor blades 102a, 102b, 102c.

The rotor assembly 100 comprises a plurality of connecting members 104a, 104b, 104c attached to each of the helical rotor blades 102a, 102b 102c. The helical rotor blades 102a, 102b, 102c are supported and maintained in a parallel configuration by means of the plurality of connecting members 104a, 104b, 104c. In an embodiment, each connecting member 104a, 104b, 104c is a Y-shaped member comprising a plurality of profile arms 105 for attaching with equal number of helical rotor blades 102a, 102b, 102c. In other words, each of the profile arms 105 is attached to a different helical rotor blade in an embodiment. In an embodiment, each connecting member 104a, 104b, 104c comprises three profile arms 105. Each profile arm is dedicated to being attached to a respective helical rotor blade. The plurality of connecting members 104a, 104b, 104c is arranged in parallel configuration one above the other with a predefined distance between two consecutive connecting members. In a preferred embodiment, the plurality of connecting members 104a, 104b, 104c is coaxial with a central longitudinal axis S-S of the rotor assembly.

The helical rotor blades 102a, 102b 102c and the connecting members 104a, 104b, 104c are configured to rotate about the central longitudinal axis of the rotor assembly 100. The connecting members 104a, 104b, 104c are configured to provide stability to the rotor assembly 100 and to transmit rotational motion from the helical rotor blades 102a, 102b, 102c to a shaft (not shown) of the turbine. In an embodiment, the shaft of the turbine is assembled through the central longitudinal axis S-S of the rotor assembly 100 for power generation.

According to the present invention, each helical rotor blades 102a, 102b, 102c is derived from NACA profiles. In a preferred embodiment, the NACA profile of each helical rotor blades is symmetrical. However, in another embodiment, these profiles can be made asymmetric as well without departing from the scope of the present subject matter. In another preferred embodiment, the helix of the helical rotor blades is provided with a predetermined angle of twist. In different embodiments, multiple variations of the twist can be given without departing from the present subject matter.

In accordance with the present subject matter, each helical rotor blade 102a, 102b, 102c comprises a plurality of fins 106 on their surfaces. The fins are added on the helical rotor blades 102a, 102b, 102c comprising a predetermined angle of twist. In a preferred embodiment, the fins 106 comprise the same NACA profile as the main helical profile of the helical rotor blades 102a, 102b, 102c on which said fins are provided. Moreover, each fin 106 includes a leading edge 111 and a trailing edge 112. In an embodiment, the profile of each fin 106 is enlarged in scale by 1.1-2 times, preferably, 1.2 times of the profile of the helical rotor blades 102a, 102b, 102c on which it is provided. Further, about 20% of each fin with enlarged profile is shaved off from towards the trailing edge 112 of each fin, as shown in FIGS. 1 to 3. The fins 106 are attached to the surface of the helical rotor blades by merging the profile of fins with the profile of respective helical rotor blades. In an embodiment, the trailing edge of the larger airfoil is merged with the trailing edge of the base NACA profile. This effectively changes the NACA profile characteristics but the dynamics of the leading edge remain consistent. In another embodiment, different NACA profiles may be employed in the final assembly.

In an embodiment, a fillet 107 is obtained from enlarged profile of fins and added at a junction of the trailing edge 112 of each fin 106 and the surface of the helical rotor blades 102a, 102b, 102c. The fillets 107 are then formed on the enlarged profile to correspond to the base NACA profile or the helical rotor blade profile.

Figure 4A:
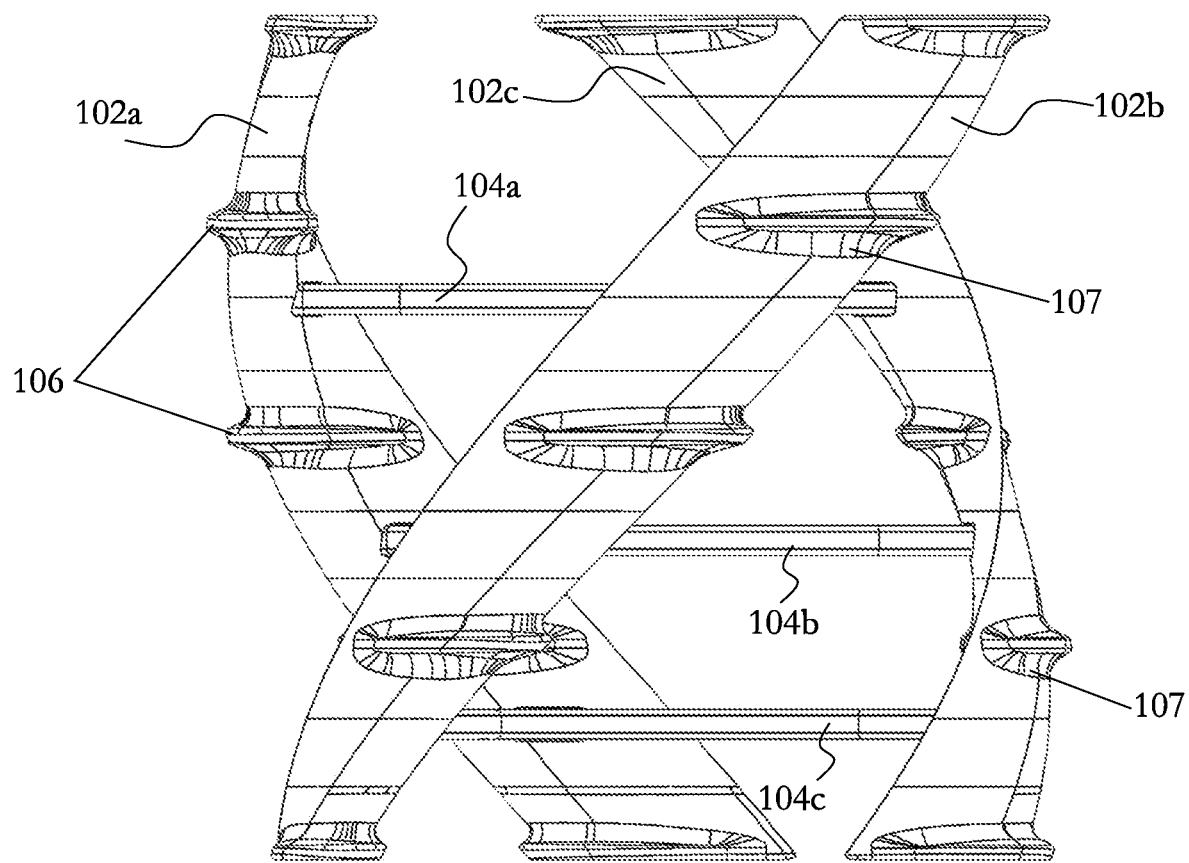
FIGS. 4A and 4B illustrates a front view and a top view of a rotor assembly of a turbine in accordance with an embodiment of the present subject matter.
Figure 4B:
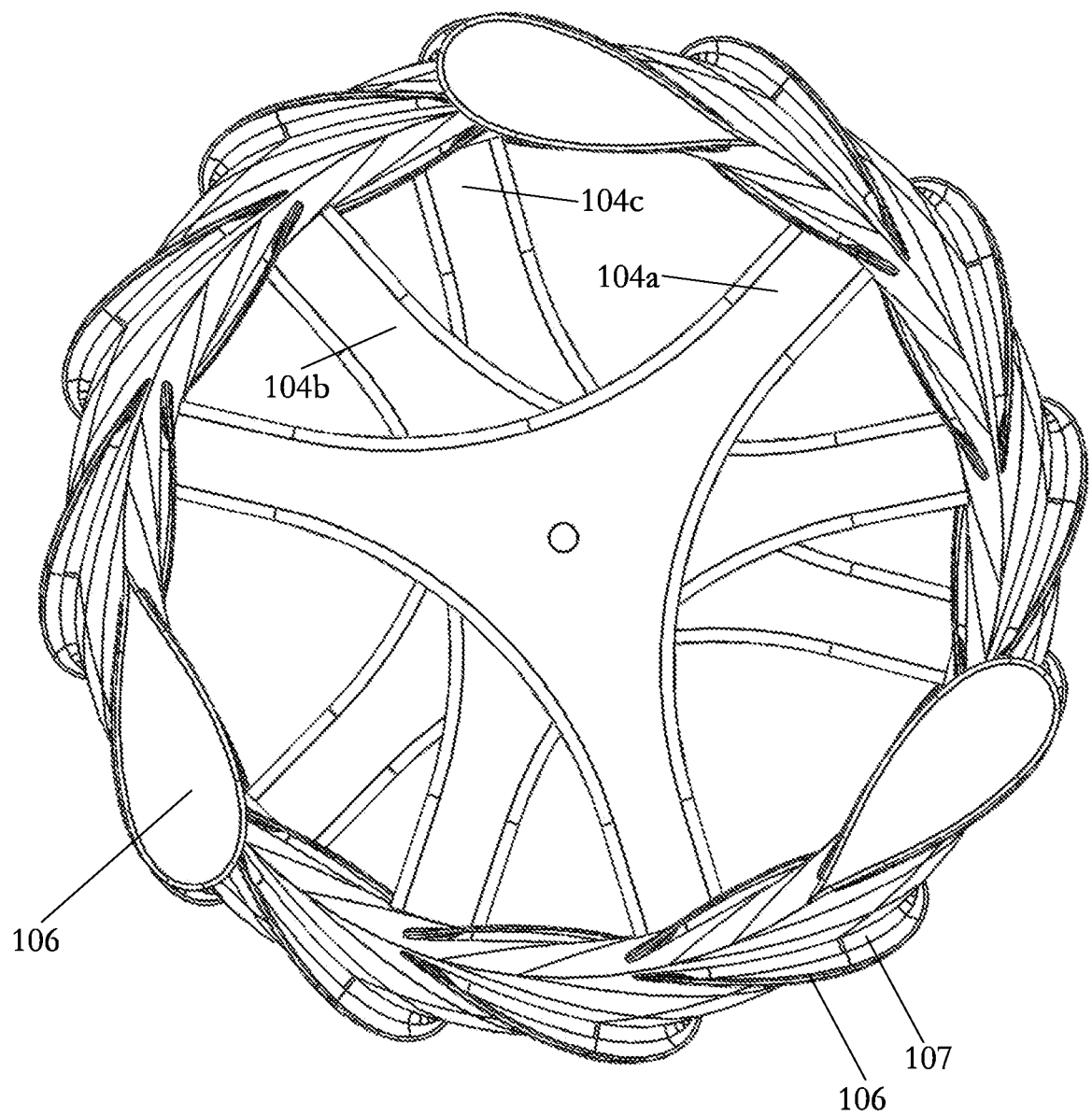

The configuration of the helical rotor blades 102a, 102b, 102c with the fins 106 according to the present subject matter is depicted in FIG. 4 in a preferred embodiment. As shown herein, in a preferred embodiment, each helical rotor blade comprises five fins 106 positioned equidistant from each other through a predetermined distance. In another embodiment, the number of fins may increase or decrease as per the requirement. In yet another embodiment, the fins may be positioned at varying distances between one other instead of being equidistant. Each helical rotor blade comprises a plurality of lanes/channels 108, which are formed between each consecutive pair of the fins 106. The predetermined distance between the consecutive fins is equal for each of the plurality of helical rotor blades 102a, 102b, 102c. The fins 106 according to the present subject matter enable channeling of flow of fluid around the helical rotor blades 102a, 102b, 102c and thus, allow the fluid flow to be confined within the lanes/channels 108 around an outer periphery of the helical rotor blades 102a, 102b, 102c. Thus, such a formation of fins 106 minimizes turbulence of the fluid flow around the helical rotor blades, particularly while leaving the surface of the NACA profile of helical rotor blades 102, 102b, 102c. Moreover, during rotation of the rotor assembly 100, the fins 106 ensure that fluid flows in the vicinity of the helical rotor blades within the lanes/channels 108 around the helical rotor blades 102a, 102b, 102c.

In order to facilitate channeling of flow of fluid, the fins 106 are located equidistant from each other on each of the helical rotor blades 102a, 102b, 102c. Further, in a preferred embodiment, the distance of each fin 106 from a top end 109 or a bottom end 110 of one helical rotor blade 102a, 102b, 102c is same as the distance of fins 106 from a top end 109 or a bottom end 110 of other helical rotor blades 102a, 102b, 102c respectively. This enables desired channeling of flow of fluid during rotation of the rotor assembly 100 of the turbine surrounded by said fluid. Keeping the flow channelized into sections leads to higher efficiency of the turbine due to reduced turbulence of water/fluid after first incidence with the helical rotor blades 102a, 102b, 102c and rotor assembly 100. The water/fluid particles that interact with the helical rotor blades after the first incidence are also low in turbulence. This helps in increasing the overall efficiency of the rotor and power generation system of the turbine as well.

In an embodiment, the rotor assembly 100 can be installed under water either individually or with plurality of other rotor assemblies 100 in an array/series for power generation. During operation, water flows past the helical rotor blades of the turbine, which rotate due to aerodynamic lift. The fins 106 provide predetermined channeling of water flowing through the rotor assembly 100, thereby providing enhanced efficiency in case of a single turbine or a system comprising group of turbines. The present invention enables placing of turbines closer together, thereby allowing more power to be produced per unit area of the installed capacity. In other words, the present invention provides compact turbine systems, contrary to the conventional systems. Further, the present invention provides an increased power output per unit of the turbine and an increased power output per array/series of the turbines. According to the present embodiment, the turbine of present invention is used with water. However, it is clarified that the present invention is not limited to be employed in water for power generation. The turbine of present invention can be employed in other fluids, for example, wind/air as well.

In an embodiment, the helical turbine blades according to the present subject matter may include more fins than those depicted in FIGS. 1 to 4. Further, the present invention may also provide rearrangement of fins placed on the helical turbine from that shown in FIGS. 1 to 4 without deviating from the scope of the present subject matter. In another embodiment, the fins of the helical rotor blades may be made asymmetric along the height of the turbine. In yet another embodiment, the connecting members are made as airfoils to further improve aerodynamic efficiency of the turbine.

Performance/Efficiency Curves Comparison

The observations of output of turbines comprising straight blade rotor, helical blade rotor and helical blade with fin rotor according to the present invention after conducting experiments are provided hereinbelow.

A comparison of outputs of aforesaid different types of turbines has been mapped in the form of a plurality of performance/efficiency curves. The performance curves are illustrated in FIGS. 5 to 12 of present application.

Figure 5:
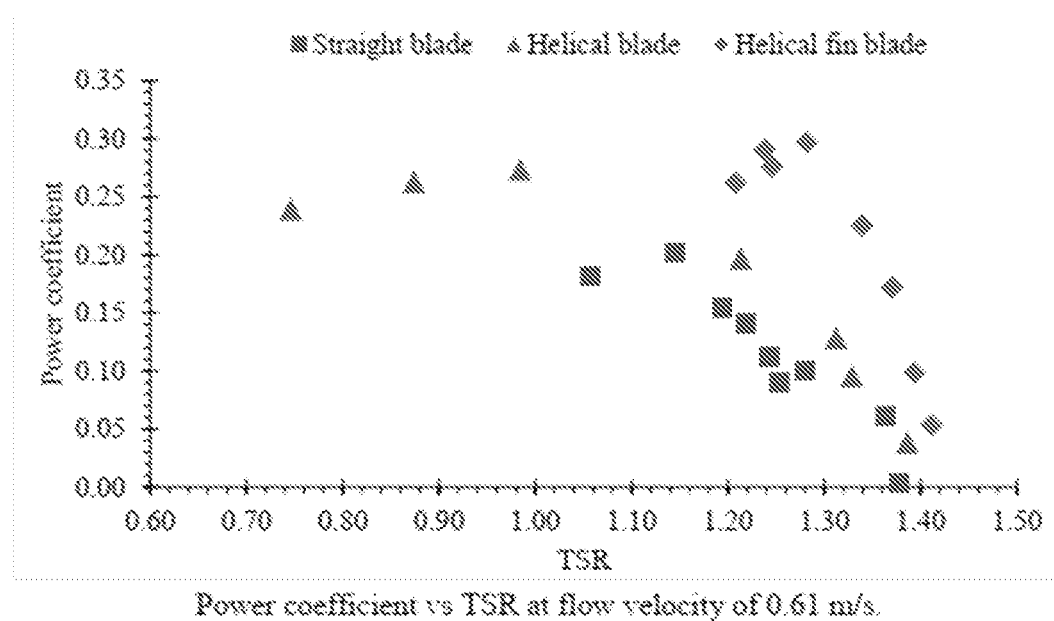
FIGS. 5 to 12 illustrate a plurality of performance/efficiency curves showing a comparison among turbines comprising straight blades, helical blades and helical blades with fin respectively.

FIG. 5 illustrates power coefficient vs TSR (Tip Speed Ratio) curves for the aforesaid different types of turbines at a flow velocity of 0.61 m/s.

Figure 6:
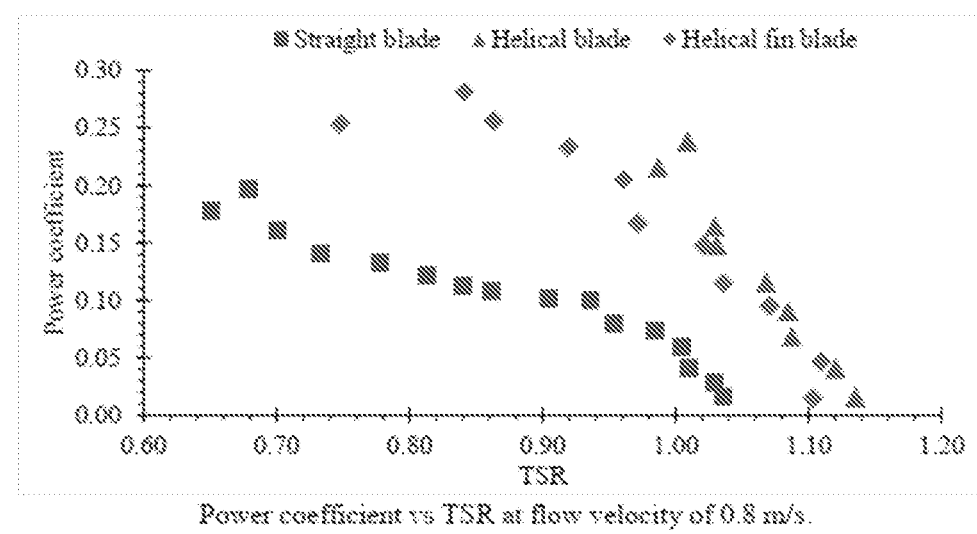

FIG. 6 illustrates power coefficient vs TSR curves for the aforesaid different types of turbines at a flow velocity of 0.8 m/s.

Figure 7:
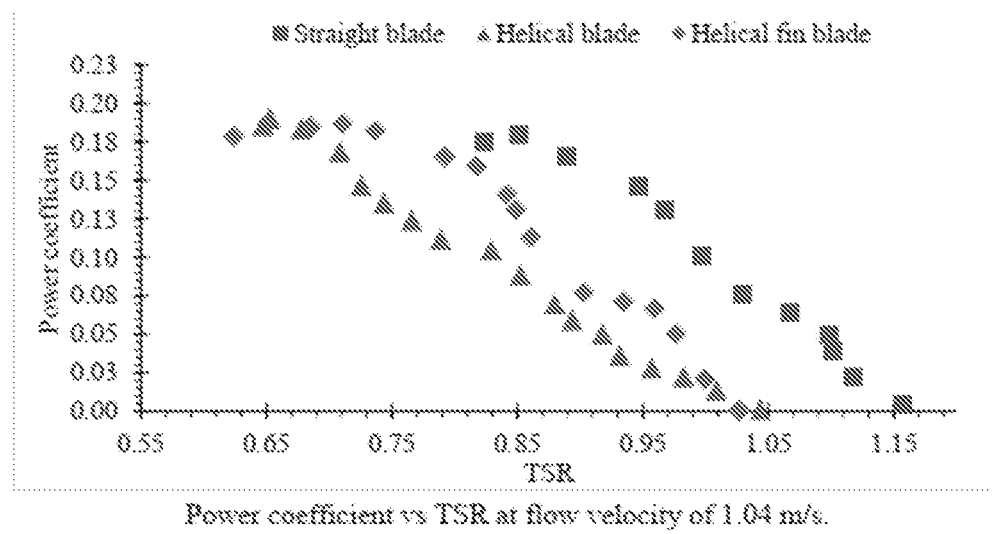

FIG. 7 illustrates power coefficient vs TSR curves for the aforesaid different types of turbines at a flow velocity of 1.04 m/s.

Figure 8:
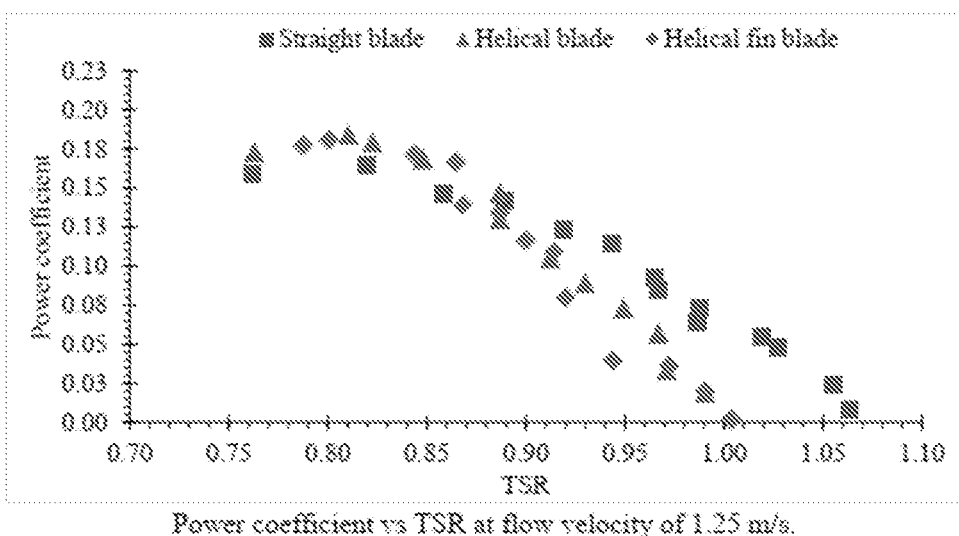

FIG. 8 illustrates power coefficient vs TSR curves for the aforesaid different types of turbines at a flow velocity of 1.25 m/s.

Figure 9:
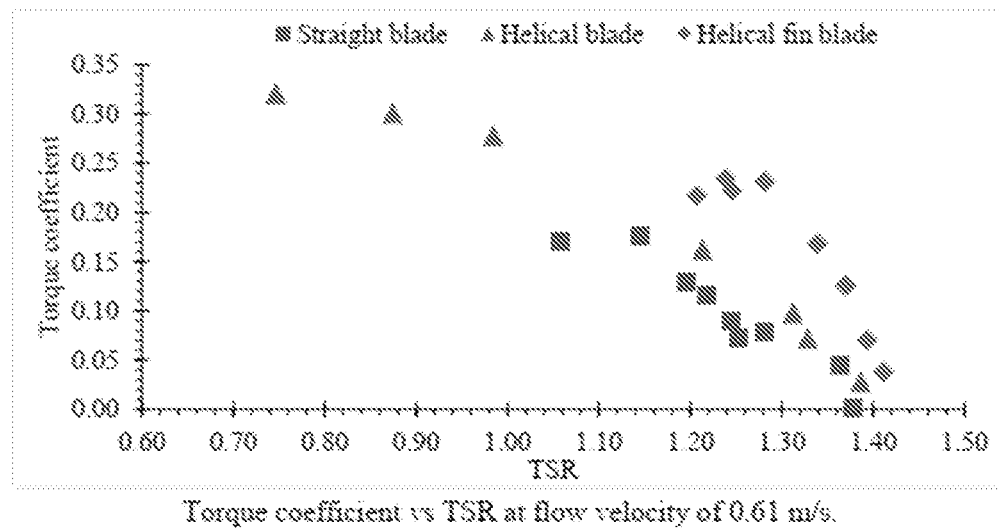

FIG. 9 illustrates torque coefficient vs TSR curves for aforesaid different types of turbines at a flow velocity of 0.61 m/s.

Figure 10:
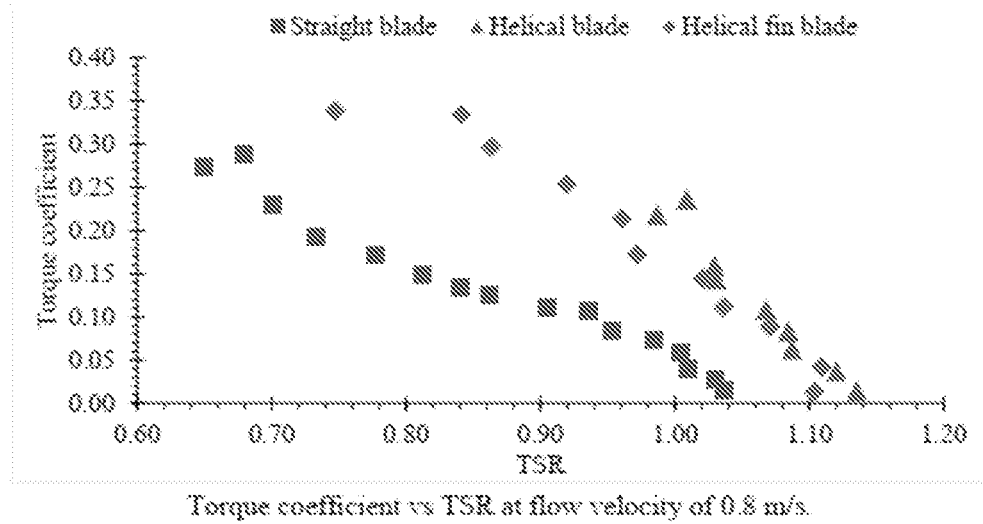

FIG. 10 illustrates torque coefficient vs TSR curves for aforesaid different types of turbines at a flow velocity of 0.8 m/s.

Figure 11:
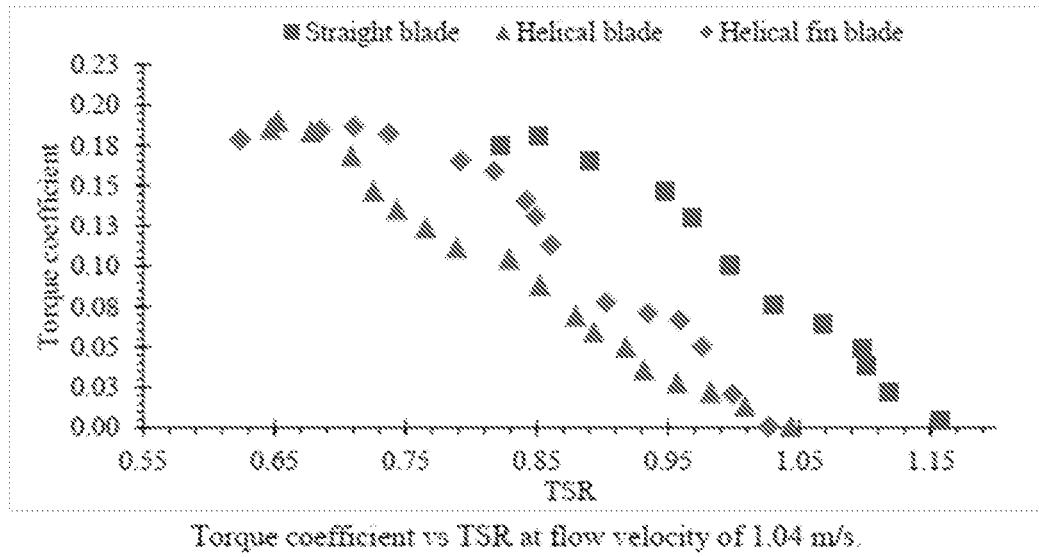

FIG. 11 illustrates torque coefficient vs TSR curves for aforesaid different types of turbines at a flow velocity of 1.04 m/s.

Figure 12:
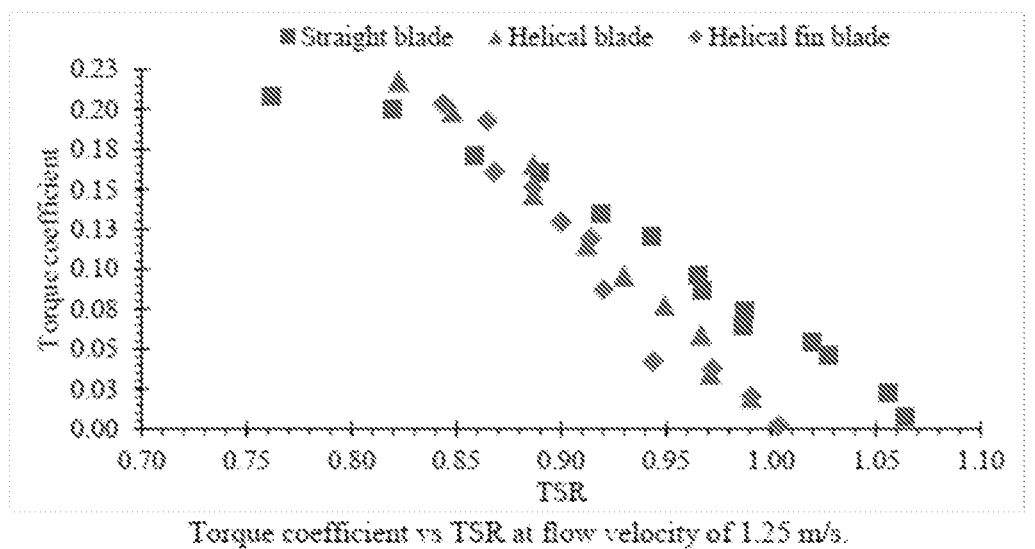

FIG. 12 illustrates torque coefficient vs TSR curves for aforesaid different types of turbines at a flow velocity of 1.25 m/s.

Furthermore, provided below is the Maximum value of power coefficient for aforesaid different types of turbines and corresponding optimum value of TSR value at the flow speed of 0.61 m/s:

| Sr. No. | Turbine Unit | Power coefficient | TSR | Velocity |
|---|---|---|---|---|
| 1. | Darrieus turbine | 0.202 | 1.14 | 0.61 |
| 2. | Helical turbine | 0.273 | 0.98 | 0.61 |
| 3. | Helical Finned turbine | 0.297 | 1.28 | 0.61 |

The aforesaid types of turbines were tested at 4 different values of velocity and the efficiency of the turbine comprising helical rotor blades with fins according to the present invention has been found to be maximum as 29.7% corresponding to the flow velocity of 0.61 m/s. Torque characteristics of the turbine of present invention, that is, turbine comprising helical rotor blades with fins in each rotation were found to be smoother than Darrieus turbine (turbine comprising straight blade rotor) and the turbine comprising helical blade rotor without fins.

While the preferred embodiments of the present invention have been described hereinabove, it should be understood that various changes, adaptations, and modifications may be made therein without departing from the spirit of the invention and the scope of the appended claims. It will be obvious to a person skilled in the art that the present invention may be embodied in other specific forms without departing from its spirit or essential characteristics. The described embodiments are to be considered in all respects only as illustrative and not restrictive.

I claim:

1. A rotor assembly for a turbine, the rotor assembly comprising:
   a plurality of rotor blades having a teardrop profile and being curved about their respective longitudinal axes A-A, B-B and C-C; and
   at least one connecting member attached to each of the plurality of rotor blades;
   each blade of the plurality of rotor blades having a plurality of fins extending outward from a surface of the blade in a direction generally perpendicular to the respective longitudinal axis, wherein each fin of the plurality of fins has an enlarged teardrop profile in comparison to the teardrop profile of the blade on which that fin is disposed, wherein a trailing edge of each fin of the plurality of fins ends inward of a trailing edge of the blade on which that fin is disposed.

2. The rotor assembly as claimed in claim 1, wherein the rotor blades are curved in a helical shape defining a predetermined helix/twist angle.

3. The rotor assembly as claimed in claim 1, wherein the rotor blades are curved to position an upper half portion of each rotor blade on a first side of the respective longitudinal axis A-A, B-B and C-C and a lower half portion of each rotor blade on a second side, opposite to the first side of the respective longitudinal axis A-A, B-B and C-C.

4. The rotor assembly as claimed in claim 3, wherein the upper half portion comprises a portion of the respective rotor blade above a respective transverse axis T-T of the rotor blade and the lower half portion of the rotor blade comprises a portion below the respective transverse axis T-T of the rotor blade.

5. The rotor assembly as claimed in claim 1, wherein the connecting member is a Y-shaped member comprising three profile arms.

6. The rotor assembly as claimed in claim 1, wherein each profile arm of the connecting member is attached to a different rotor blade.

7. The rotor assembly as claimed in claim 1, wherein a plurality of connecting members is provided above one another with a predefined distance between two consecutive connecting members.

8. The rotor assembly as claimed in claim 1, wherein the plurality of connecting members is coaxial with a central longitudinal axis S-S of the rotor assembly.

9. The rotor assembly as claimed in claim 1, wherein the helical rotor blades and the connecting members are configured to rotate about the central longitudinal axis S-S of the rotor assembly.

10. The rotor assembly as claimed in claim 1, wherein the profile of each fin of the plurality of fins is enlarged in scale by 1.1-2 times the profile of the rotor blade on which that fin is disposed.

11. The rotor assembly as claimed in claim 1, wherein the profile of each fin is merged with the profile of the blade on which that fin is disposed.

12. The rotor assembly as claimed in claim 1, wherein the plurality of fins include, on each rotor blade, four fins positioned equidistant from each other through a predetermined distance, said predetermined distance between the four fins is equal for each of the plurality of rotor blades.

13. The rotor assembly as claimed in claim 1, a fillet at a junction of the trailing edge of each fin and the surface of the rotor blades.

14. The rotor assembly as claimed in claim 1, wherein a lane/channel is formed between adjacent fins on each blade to direct a flow of fluid flowing around the rotor blades.

15. The rotor assembly as claimed in claim 14, wherein the fluid flowing around the rotor blades is water.

* * * * *